United States Patent
Ge et al.

(10) Patent No.: US 12,517,277 B2
(45) Date of Patent: Jan. 6, 2026

(54) BLUE-SHIFT OF RESONANCE FREQUENCY TO DETECT FLUID CHANNEL BEHIND CEMENTED CASING

(71) Applicant: Halliburton Energy Services, Inc., Houston, TX (US)

(72) Inventors: Yao Ge, Singapore (SG); Otto Fanini, Houston, TX (US); Frederico Heloui de Araujo, Rio de Janeiro (BR)

(73) Assignee: Halliburton Energy Services, Inc., Houston, TX (US)

(*) Notice: Subject to any disclaimer, the term of this patent is extended or adjusted under 35 U.S.C. 154(b) by 255 days.

(21) Appl. No.: 18/213,689

(22) Filed: Jun. 23, 2023

(65) Prior Publication Data

US 2024/0427047 A1   Dec. 26, 2024

(51) Int. Cl.
*G01V 1/50* (2006.01)
*E21B 47/005* (2012.01)

(52) U.S. Cl.
CPC .............. *G01V 1/50* (2013.01); *E21B 47/005* (2020.05); *G01V 2210/1299* (2013.01); *G01V 2210/1429* (2013.01)

(58) Field of Classification Search
CPC ............. G01V 1/50; G01V 2210/1299; G01V 2210/1429; E21B 47/005
See application file for complete search history.

(56) References Cited

U.S. PATENT DOCUMENTS

| | | | |
|---|---|---|---|
| 4,255,798 A | 3/1981 | Havira | |
| 5,859,811 A | 1/1999 | Miller et al. | |
| 7,681,450 B2 | 3/2010 | Bolshakov et al. | |
| 10,801,997 B2 | 10/2020 | Zhao et al. | |
| 10,920,569 B2 | 2/2021 | Mandal | |
| 11,091,999 B2 | 8/2021 | Zhang et al. | |
| 2020/0150304 A1* | 5/2020 | Han | G01N 29/46 |
| 2020/0233113 A1* | 7/2020 | Luo | G01V 1/42 |
| 2021/0247538 A1 | 8/2021 | Guedes et al. | |
| 2022/0381133 A1 | 12/2022 | Ge et al. | |
| 2023/0175386 A1* | 6/2023 | Ge | G01V 1/50 367/35 |

FOREIGN PATENT DOCUMENTS

WO    2018064170 A1    4/2018

OTHER PUBLICATIONS

U.S. Appl. No. 17/955,162, filed Sep. 28, 2022.

(Continued)

*Primary Examiner* — Krystine E Breier
(74) *Attorney, Agent, or Firm* — John Wustenberg; C. Tumey Law Group PLLC

(57) ABSTRACT

A method comprising selecting a cement sensitive mode based at least on the configuration of a conduit string, transmitting an acoustic signal into at least part of the conduit string, measuring a return signal from at least part of the conduit string, computing one or more modal resonance frequencies of a resonance mode from the return signal, and forming a modal frequency log of the resonance signal with at least the one or more modal resonance frequencies. In examples, a system comprising a transmitter configured to transmit an acoustic signal into at least part of a conduit string, a receiver configured to measuring a return signal from at least part of the conduit string.

19 Claims, 11 Drawing Sheets

(56) References Cited

OTHER PUBLICATIONS

U.S. Appl. No. 17/336,155, filed Jun. 1, 2021.
International Search Report and Written Opinion for International Patent Application No. PCT/US2023/023959 dated Feb. 6, 2024. PDF file. 8 pages.
International Search Report and Written Opinion for International Patent Application No. PCT/US2023/028197 dated Mar. 12, 2024. PDF file. 8 pages.

* cited by examiner ered by an information handling system at surface 122.

BLUE-SHIFT OF RESONANCE FREQUENCY TO DETECT FLUID CHANNEL BEHIND CEMENTED CASING

BACKGROUND

For oil and gas exploration and production, a network of wells, installations and other conduits may be established by connecting sections of metal pipe together. For example, a well installation may be completed, in part, by lowering multiple sections of metal pipe (i.e., a conduit string) into a wellbore, and cementing the conduit string in place. In some well installations, multiple conduit strings are employed (e.g., a concentric multi-string arrangement) to allow for different operations related to well completion, production, or enhanced oil recovery (EOR) options.

At the end of a well installations' life, the well installation may be plugged and abandoned. Understanding cement bond integrity to a conduit string may be beneficial in determining how to plug the well installation. Generally, acoustics may be implemented by acoustic tools to form CBLs (cement bond log). Traditional acoustic tools require the production tubing to be pulled out so that the signal may directly reach casing through borehole fluid. A need in the industry exists in which a CBL may be formed without removing production tubing. Through tubing cement evaluation is challenging because acoustic devices do not have enough energy to insonify the production tubing with acoustic waves. Thus, the casing response may be too low to the overall signal received signal, making it difficult to evaluate the cement property behind the casing.

Additionally, acoustic waves may resonate within a well, defined as resonance mode acoustic waves. Resonance mode acoustic waves may provide valuable information in CBL evaluation. Resonance mode acoustic waves may be sensitive to cement bonding with the casing in the presence of tubing. However, it may be difficult to evaluate a CBL in the presence of non-resonant acoustic waves.

BRIEF DESCRIPTION OF THE DRAWINGS

These drawings illustrate certain aspects of some examples of the present disclosure and should not be used to limit or define the disclosure.

DETAILED DESCRIPTION

Methods and systems herein may generally relate to enhancing the resonance mode acoustic wave(s) and removing the non-resonance wave(s). Specifically, acoustic sensing may incorporate resonance wave(s) and non-resonance wave(s) and provide continuous in situ measurements of parameters related to cement bonding to a casing. As a return, acoustic sensing may be used in cased borehole monitoring applications. As disclosed herein, acoustic logging tools may be used to emit an acoustic signal which may traverse through at least part of a conduit string to at least part of a casing. Reflected signals that are measured by the acoustic logging tool may be defined as return signals. Return signals may be analyzed to determine if the section of casing is fully bonded, is free pipe, or if a partially bonded section. The return signal may comprise the resonance mode signal as well as other signals such as reflection, guided waves, tool mode, and/or Stoneley wave. As described below, methods and systems may focus on forming a distinction between resonance and non-resonance signals and exploiting the distinction to remove non-resonance signals. Specifically, methods and systems herein may be directed to determining a frequency spectrum for non-resonance and resonance signals and separating non-resonance signals from resonance signals.

Figure 1:
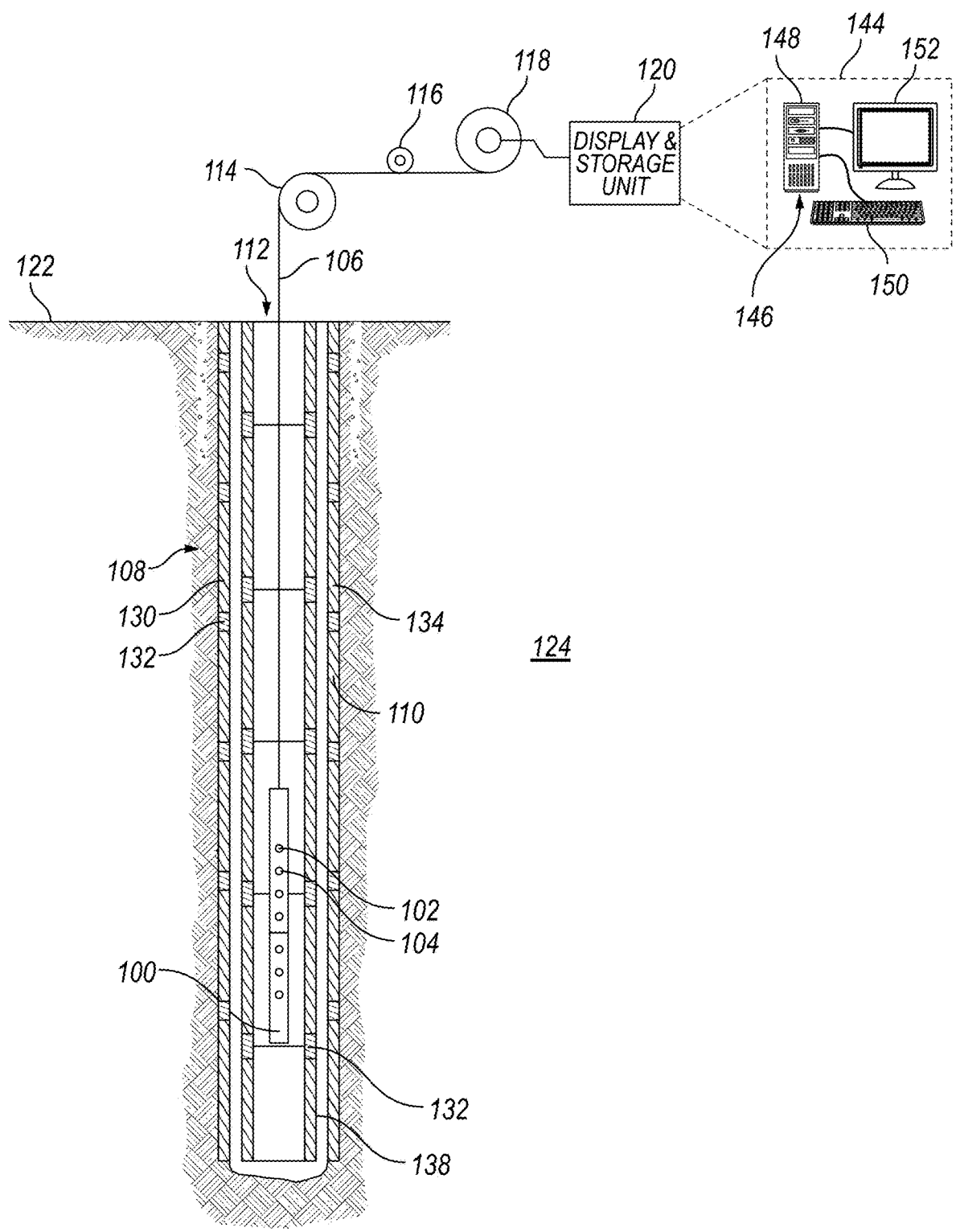
FIG. 1 illustrates a system including an acoustic logging tool.

FIG. 1 illustrates an operating environment for an acoustic logging tool 100 as disclosed herein. Acoustic logging tool 100 may comprise a transmitter 102 and/or a receiver 104. Additionally, transmitter 102 and receiver 104 may be configured to rotate in acoustic logging tool 100. In examples, there may be any number of transmitters 102 and/or any number of receivers 104, which may be disposed on acoustic logging tool 100. Additionally, transmitter 102 and receiver 104 may be configured to rotate in acoustic logging tool 100. Acoustic logging tool 100 may be operatively coupled to a conveyance 106 (e.g., wireline, slickline, coiled tubing, pipe, downhole tractor, and/or the like) which may provide mechanical suspension, as well as electrical connectivity, for acoustic logging tool 100. Conveyance 106 and acoustic logging tool 100 may extend within conduit string 108 to a desired depth within the wellbore 110. In examples, tubing may be concentric in the casing, however in other examples the tubing may not be concentric Conveyance 106, which may include one or more electrical conductors, may exit wellhead 112, may pass around pulley 114, may engage odometer 116, and may be reeled onto winch 118, which may be employed to raise and lower the tool assembly in the wellbore 110. Signals recorded by acoustic logging tool 100 may be stored on memory and then processed by display and storage unit 120 after recovery of acoustic logging tool 100 from wellbore 110. Alternatively, signals recorded by acoustic logging tool 100 may be conducted to display and storage unit 120 by way of conveyance 106. Display and storage unit 120 may process the signals, and the information contained therein may be displayed for an operator to observe and stored for future processing and reference. Alternatively, signals may be processed downhole prior to receipt by display and storage unit 120 or both downhole and at surface 122, for example, by display and storage unit 120. Display and storage unit 120 may also contain an apparatus for supplying control signals and power to acoustic logging tool 100. Typical conduit string 108 may extend from wellhead 112 at or above ground level to a selected depth within a wellbore 110. Conduit string 108 may comprise a plurality of joints 130 or segments of conduit string 108, each joint 130 being connected to the adjacent segments by a collar 132. Additionally, conduit string may include a plurality of tubing.

FIG. 1 also illustrates inner conduit string 108, which may be positioned inside of conduit string 108 extending part of the distance down wellbore 110. Inner conduit string 108 may be production tubing, tubing string, conduit string, or other pipe disposed within conduit string 108. Inner conduit string 108 may comprise concentric pipes. It should be noted that concentric pipes may be connected by collars 132. Acoustic logging tool 100 may be dimensioned so that it may be lowered into the wellbore 110 through inner conduit string 108, thus avoiding the difficulty and expense associated with pulling inner conduit string 108 out of wellbore 110. Herein conduit string 108 may be comprised of inner conduit string 138.

In logging systems, such as, for example, logging systems utilizing the acoustic logging tool 100, a digital telemetry system may be employed, wherein an electrical circuit may be used to both supply power to acoustic logging tool 100 and to transfer data between display and storage unit 120 and acoustic logging tool 100. A DC voltage may be provided to acoustic logging tool 100 by a power supply located above ground level, and data may be coupled to the DC power conductor by a baseband current pulse system. Alternatively, acoustic logging tool 100 may be powered by batteries located within the downhole tool assembly, and/or the data provided by acoustic logging tool 100 may be stored within the downhole tool assembly, rather than transmitted to the surface during logging (corrosion detection).

Acoustic logging tool 100 may be used for excitation of transmitter 102. As illustrated, one or more receiver 104 may be positioned on the acoustic logging tool 100 at selected distances (e.g., axial spacing) away from transmitter 102. The axial spacing of receiver 104 from transmitter 102 may vary, for example, from about 0 inches (0 cm) to about 40 inches (101.6 cm) or more. In some embodiments, at least one receiver 104 may be placed near the transmitter 102 (e.g., within at least 1 inch (2.5 cm) while one or more additional receivers may be spaced from 1 foot (30.5 cm) to about 5 feet (152 cm) or more from the transmitter 102. It should be understood that the configuration of acoustic logging tool 100 shown on FIG. 1 is merely illustrative and other configurations of acoustic logging tool 100 may be used with the present techniques. In addition, acoustic logging tool 100 may include more than one transmitter 102 and more than one receiver 104. For example, an array of receivers 104 may be used. Transmitters 102 may include any suitable acoustic source for generating acoustic waves downhole, including, but not limited to, monopole and multipole sources (e.g., dipole, cross-dipole, quadrupole, hexapole, or higher order multi-pole transmitters). Additionally, one or more transmitters 102 (which may include segmented transmitters) may be combined to excite a mode corresponding to an irregular/arbitrary mode shape. Specific examples of suitable transmitters 102 may include, but are not limited to, piezoelectric elements, bender bars, or other transducers suitable for generating acoustic waves downhole. Receiver 104 may include any suitable acoustic receiver suitable for use downhole, including piezoelectric elements that may convert acoustic waves into an electric signal.

Figure 2:
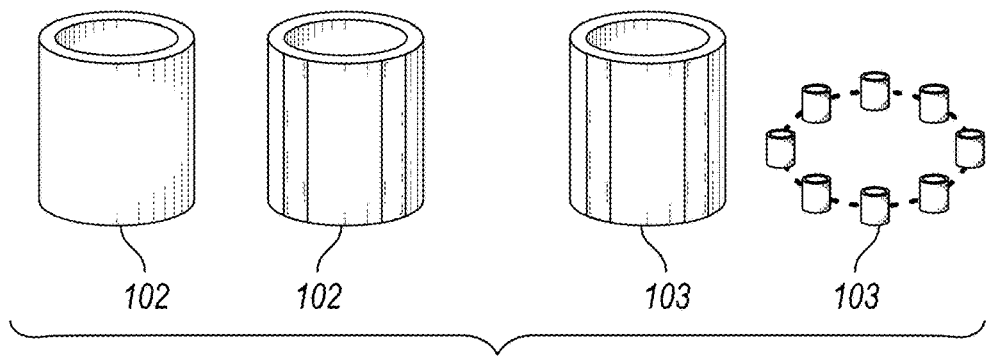
FIG. 2 illustrates an example of a transmitter and a receiver.

FIG. 2 illustrates examples of transmitter 102 and receiver 104. As discussed above, transmitters 102 (as well as receivers 104) may be a monopole or include multipole sources (e.g., dipole, cross-dipole, quadrupole, hexapole, or higher order multi-pole transmitters). Additionally, one or more transmitters 102 (which may include segmented transmitters) may be combined to excite a mode corresponding to an irregular/arbitrary mode shape. For example, transmitter 102 may be cylindrical and/or segmented piezoelectric tube. Additionally, transmitter 103 may be a monopole, a dipole, a cross-dipole transmitter, a quadrupole, or a rotating transmitter of any mode, and/or a higher order transmitter. Receivers 104 may include a segmented piezoelectric tube, individual receiver, or azimuthal receiver arrays, which may produce azimuthal variation of bonding behind casing 134. It should be noted that transmitter 102 and receiver 104 may be combined into a single element with the ability to both transmit acoustic waves and receiver acoustic waves, which may be identified as a transceiver.

Referring back to FIG. 1, transmission of acoustic waves by the transmitter 102 and the recordation of signals by receivers 104 may be controlled by display and storage unit 120, which may include an information handling system 144. As illustrated, the information handling system 144 may be a component of the display and storage unit 120. Alternatively, the information handling system 144 may be a component of acoustic logging tool 100. An information handling system 144 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 144 may be a personal computer, a network storage device, or any other suitable device and may vary in size, shape, performance, functionality, and price. Information handling system 144 may include a processing unit 146 (e.g., microprocessor, central processing unit, etc.) that may process EM log data by executing software or instructions obtained from a local non-transitory computer readable media 148 (e.g., optical disks, magnetic disks). The non-transitory computer readable media 148 may store software or instructions of the methods described herein. Non-transitory computer readable media 148 may include any instrumentality or aggregation of instrumentalities that may retain data and/or instructions for a period of time. Non-transitory computer readable media 148 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing. Information handling system 144 may also include input device(s) 150 (e.g., keyboard, mouse, touchpad, etc.) and output device(s) 152 (e.g., monitor, printer, etc.). The input device(s) 150 and output device(s) 152 provide a user interface that enables an operator to interact with acoustic logging tool 100 and/or software executed by processing unit 146. For example, information handling system 144 may enable an operator to select analysis options, view collected log data, view analysis returns, and/or perform other tasks.

Figure 3:
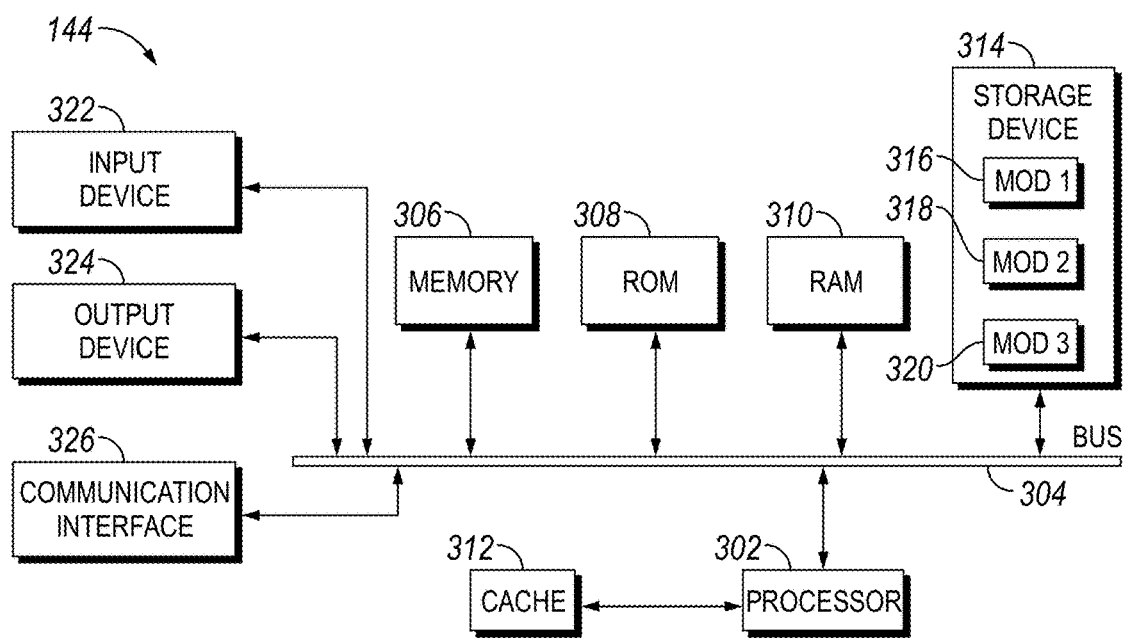
FIG. 3 illustrates an example information handling system.

FIG. 3 illustrates an example information handling system 144 which may be employed to perform various steps, methods, and techniques disclosed herein. As illustrated, information handling system 144 includes a processing unit (CPU or processor) 302 and a system bus 304 that couples various system components including system memory 306 such as read only memory (ROM) 308 and random-access memory (RAM) 310 to processor 302. Processors disclosed herein may all be forms of this processor 302. Information handling system 144 may include a cache 312 of high-speed memory connected directly with, in close proximity to, or integrated as part of processor 302. Information handling system 144 copies data from memory 306 and/or storage device 314 to cache 312 for quick access by processor 302. In this way, cache 312 provides a performance boost that avoids processor 302 delays while waiting for data. These and other modules may control or be configured to control processor 302 to perform various operations or actions. Other system memory 306 may be available for use as well. Memory 306 may include multiple different types of memory with different performance characteristics. It may be appreciated that the disclosure may operate on information handling system 144 with more than one processor 302 or on a group or cluster of computing devices networked together to provide greater processing capability. Processor 302 may include any general-purpose processor and a hardware module or software module, such as first module 316, second module 318, and third module 320 stored in storage device 314, configured to control processor 302 as well as a special-purpose processor where software instructions are incorporated into processor 302. Processor 302 may be a self-contained computing system, containing multiple cores or processors, a bus, memory controller, cache, etc. A multi-core processor may be symmetric or asymmetric. Processor 302 may include multiple processors, such as a system having multiple, physically separate processors in different sockets, or a system having multiple processor cores on a single physical chip. Similarly, processor 302 may include multiple distributed processors located in multiple separate computing devices but working together such as via a communications network. Multiple processors or processor cores may share resources such as memory 306 or cache 312 or may operate using independent resources. Processor 302 may include one or more state machines, an application specific integrated circuit (ASIC), or a programmable gate array (PGA) including a field PGA (FPGA).

Each individual component discussed above may be coupled to system bus 304, which may connect each and every individual component to each other. System bus 304 may be any of several types of bus structures including a memory bus or memory controller, a peripheral bus, and a local bus using any of a variety of bus architectures. A basic input/output (BIOS) stored in ROM 308 or the like, may provide the basic routine that helps to transfer information between elements within information handling system 144, such as during start-up. Information handling system 144 further includes storage devices 314 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. Storage device 314 may include software modules 316, 318, and 320 for controlling processor 302. Information handling system 144 may include other hardware or software modules. Storage device 314 is connected to the system bus 304 by a drive interface. The drives and the associated computer-readable storage devices provide nonvolatile storage of computer-readable instructions, data structures, program modules and other data for information handling system 144. In one aspect, a hardware module that performs a particular function includes the software component stored in a tangible computer-readable storage device in connection with the necessary hardware components, such as processor 302, system bus 304, and so forth, to carry out a particular function. In another aspect, the system may use a processor and computer-readable storage device to store instructions which, when executed by the processor, cause the processor to perform operations, a method or other specific actions. The basic components and appropriate variations may be modified depending on the type of device, such as whether information handling system 144 is a small, handheld computing device, a desktop computer, or a computer server. When processor 302 executes instructions to perform "operations", processor 302 may perform the operations directly and/or facilitate, direct, or cooperate with another device or component to perform the operations.

As illustrated, information handling system 144 employs storage device 314, which may be a hard disk or other types of computer-readable storage devices which may store data that are accessible by a computer, such as magnetic cassettes, flash memory cards, digital versatile disks (DVDs), cartridges, random access memories (RAMs) 310, read only memory (ROM) 308, a cable containing a bit stream and the like, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with information handling system 144, an input device 322 represents any number of input mechanisms, such as a microphone for speech, a touch-sensitive screen for gesture or graphical input, keyboard, mouse, motion input, speech and so forth. Additionally, input device 322 may take in data from one or more sensors 136, discussed above. An output device 324 may also be one or more of a number of output mechanisms known to those of skill in the art. In some instances, multimodal systems enable a user to provide multiple types of input to communicate with information handling system 144. Communications interface 326 generally governs and manages the user input and system output. There is no restriction on operating on any particular hardware arrangement and therefore the basic hardware depicted may easily be substituted for improved hardware or firmware arrangements as they are developed.

As illustrated, each individual component described above is depicted and disclosed as individual functional blocks. The functions these blocks represent may be provided through the use of either shared or dedicated hardware, including, but not limited to, hardware capable of executing software and hardware, such as a processor 302, that is purpose-built to operate as an equivalent to software executing on a general-purpose processor. For example, the functions of one or more processors presented in FIG. 3 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 308 for storing software performing the operations described below, and random-access memory (RAM) 310 for storing returns. Very large-scale integration (VLSI) hardware embodiments, as well as custom VLSI circuitry in combination with a general-purpose DSP circuit, may also be provided.

The logical operations of the various methods, described below, are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. Information handling system 144 may practice all or part of the recited methods, may be a part of the recited systems, and/or may operate according to instructions in the recited tangible computer-readable storage devices. Such logical operations may be implemented as modules configured to control processor 302 to perform particular functions according to the programming of software modules 316, 318, and 320.

In examples, one or more parts of the example information handling system 144, up to and including the entire information handling system 144, may be virtualized. For example, a virtual processor may be a software object that executes according to a particular instruction set, even when a physical processor of the same type as the virtual processor is unavailable. A virtualization layer or a virtual "host" may enable virtualized components of one or more different computing devices or device types by translating virtualized operations to actual operations. Ultimately however, virtualized hardware of every type is implemented or executed by some underlying physical hardware. Thus, a virtualization compute layer may operate on top of a physical compute layer. The virtualization compute layer may include one or more virtual machines, an overlay network, a hypervisor, virtual switching, and any other virtualization application.

Figure 4:
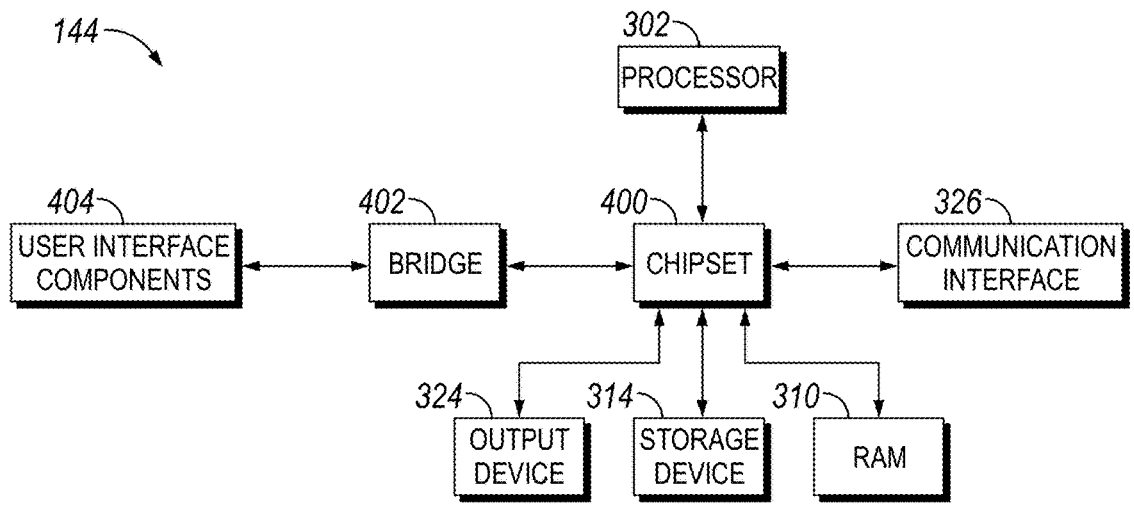
FIG. 4 illustrates another example information handling system.

FIG. 4 illustrates another example information handling system 144 having a chipset architecture that may be used in executing the described method and generating and displaying a graphical user interface (GUI). Information handling system 144 is an example of computer hardware, software, and firmware that may be used to implement the disclosed technology. Information handling system 144 may include a processor 302, representative of any number of physically and/or logically distinct resources capable of executing software, firmware, and hardware configured to perform identified computations. Processor 302 may communicate with a chipset 400 that may control input to and output from processor 302. In this example, chipset 400 outputs information to output device 324, such as a display, and may read and write information to storage device 314, which may include, for example, magnetic media, and solid-state media. Chipset 400 may also read data from and write data to RAM 310. Bridge 402 for interfacing with a variety of user interface components 404 may be provided for interfacing with chipset 400. Such user interface components 404 may include a keyboard, a microphone, touch detection and processing circuitry, a pointing device, such as a mouse, and so on. In general, inputs to information handling system 144 may come from any of a variety of sources, machine generated and/or human generated.

Chipset 400 may also interface with one or more communication interfaces 326 that may have different physical interfaces. Such communication interfaces may include interfaces for wired and wireless local area networks, for broadband wireless networks, as well as personal area networks. Some applications of the methods for generating, displaying, and using the GUI disclosed herein may include receiving ordered datasets over the physical interface or be generated by the machine itself by processor 302 analyzing data stored in storage device 314 or RAM 310. Further, information handling system 144 may receive inputs from a user via user interface components 404 and execute appropriate functions, such as browsing functions by interpreting these inputs using processor 302.

In examples, information handling system 144 may also include tangible and/or non-transitory computer-readable storage devices for carrying or having computer-executable instructions or data structures stored thereon. Such tangible computer-readable storage devices may be any available device that may be accessed by a general purpose or special purpose computer, including the functional design of any special purpose processor as described above. By way of example, and not limitation, such tangible computer-readable devices may include RAM, ROM, EEPROM, CD-ROM or other optical disk storage, magnetic disk storage or other magnetic storage devices, or any other device which may be used to carry or store desired program code in the form of computer-executable instructions, data structures, or processor chip design. When information or instructions are provided via a network, or another communications connection (either hardwired, wireless, or combination thereof), to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

In additional examples, methods may be practiced in network computing environments with many types of computer system configurations, including personal computers, hand-held devices, multi-processor systems, microprocessor-based or programmable consumer electronics, network PCs, minicomputers, mainframe computers, and the like. Examples may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Figure 5:
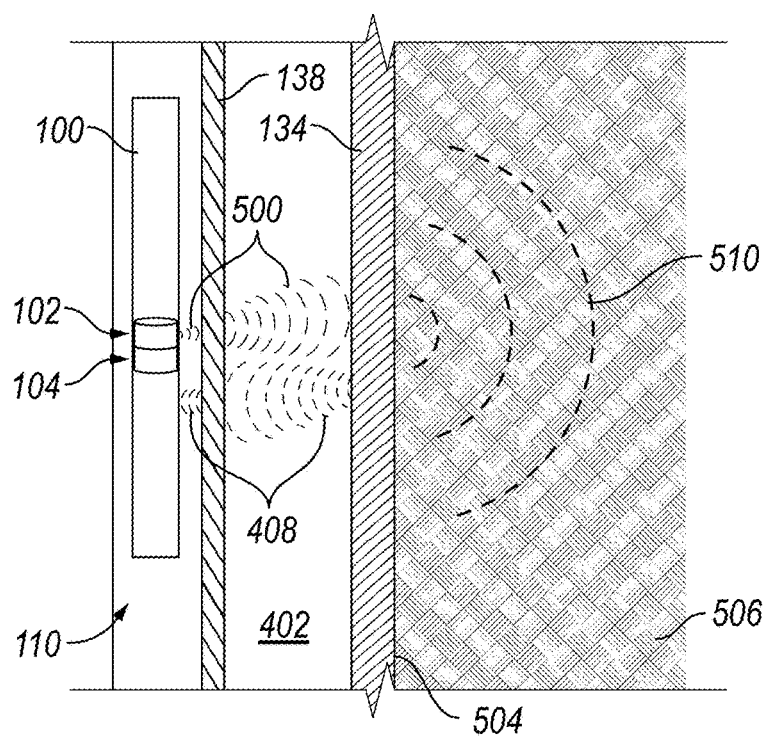
FIG. 5 illustrates the acoustic logging tool broadcasting a shaped signal.

FIG. 5 illustrates acoustic logging tool 100 disposed in wellbore 110, wherein transmitter 102 may broadcast a shaped acoustic signal 500 through inner conduit string 108, which may excite a fluid 502 that may be disposed between inner conduit string 108 and casing 134. Shaped acoustic signal 500 may be transmitted at 1 Hz to 100 MHz. It should be noted that fluid 502 may comprise mud, formation fluid, and/or reservoir fluid disposed downhole for drilling operations. Additionally, fluid 502 may be disposed within conduit string 108. Thus, fluid 502 may be within pipe string 138 and be disposed between inner conduit string 108 and casing 134. Shaped acoustic signal 500 may lose energy as it passes through conduit string 108, however, shaped acoustic signal 500 may continue to resonate through fluid 502 to casing 134. At casing 134, shaped acoustic signal 500 may interact with boundary 504 that is casing 134 and material 506. Material 506 may be cement, water, air, and/or any combination thereof. The interaction at boundary 504 may cause return signal 508 and dissipated signal 510. Return signal 508 may be reflected off boundary 504 back to acoustic logging tool 100. In examples, return signal 508 comprises reflections, refractions, and/or a resonance which is formed in late time.

As illustrated in FIG. 5, return signal 508 may interact with conduit string 138, pass through conduit string 138, and be sense, recorded, and/or measured by receiver 104. Return signal 508 may be between 1 to 100 kHz. Dissipated signal 510 may continue to move through material 506, which may continuously capture energy from dissipated signal 510 until dissipated signal 510 is extinguished. Return signal 508 may be processed to further determine if material 506 (i.e., cement, water, air, and/or the like) may be bonded to casing 134.

Figure 6:
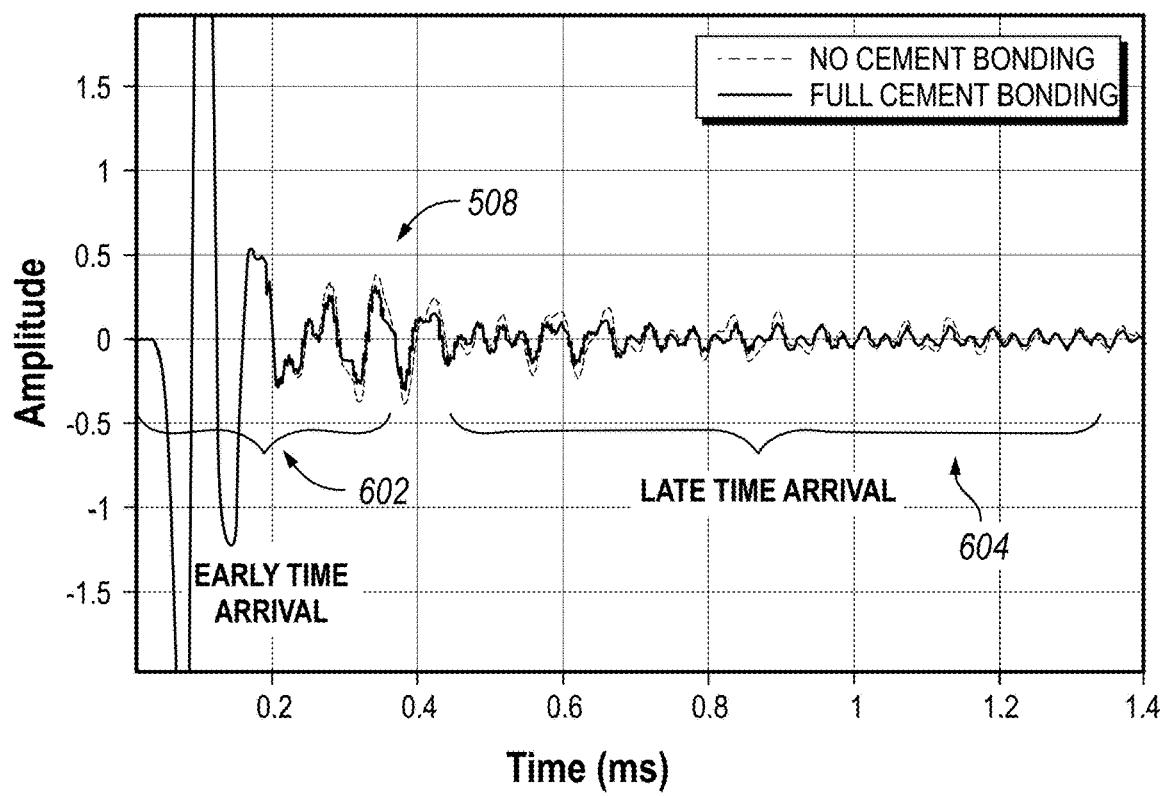
FIG. 6 illustrates graph of a time domain signal from a single receiver for two cement bonding conditions.

For example, FIG. 6 illustrates a graph of one or more return signals 508, which was captured by receiver 104 (e.g., referring to FIG. 5). As illustrated, early time arrivals 602 comprises acoustic energy, which may include reflections from conduit string 138, reflections from casing 134 through conduit string 138, guided wave refractions from conduit string 138, guided-wave refractions from casing 134 through conduit string 138 (e.g., referring to FIG. 5), Stoneley waves, tool waves, and/or the like. These waves may be categorized as non-resonance waves. After a certain time, certain waves propagate away from receiver 104 in the form of guided casing wave, guided tubing wave, tool wave, Stoneley wave and/or multiple reflections (e.g., not illustrated and represented by dissipated signal 510). Hence in late time arrivals 604, return signal 508 is observed to have fixed frequency components and with decreasing amplitude over time. As such, late arrivals 604 may comprise at least part of a resonance mode signal. Herein, resonance mode may be defined as the resonance of the conduit string 108 (e.g., referring to FIG. 1), conduit string 138, tool 100, and fluid 502 (e.g., referring to FIG. 5).

The resonance mode signal may be categorized into one or any number of poles. For example, a monopole transmitter (e.g., referring to FIG. 2) may generate monopole resonance modes. With borehole asymmetry, a monopole transmitter may also generate other multiple resonance modes, such as dipole and quadrupole modes. A signal received by receiver 104 may be decomposed to monopole, dipole, unipole, quadrupole and higher order responses, or a response with any specific mode shape. Each resonance mode may comprise a unique frequency, mode shape, modal decay rate, and/or attenuation rate. Each multipole resonance mode may be identified by. Mode analysis may be used to identify the frequency of.

Figure 7:
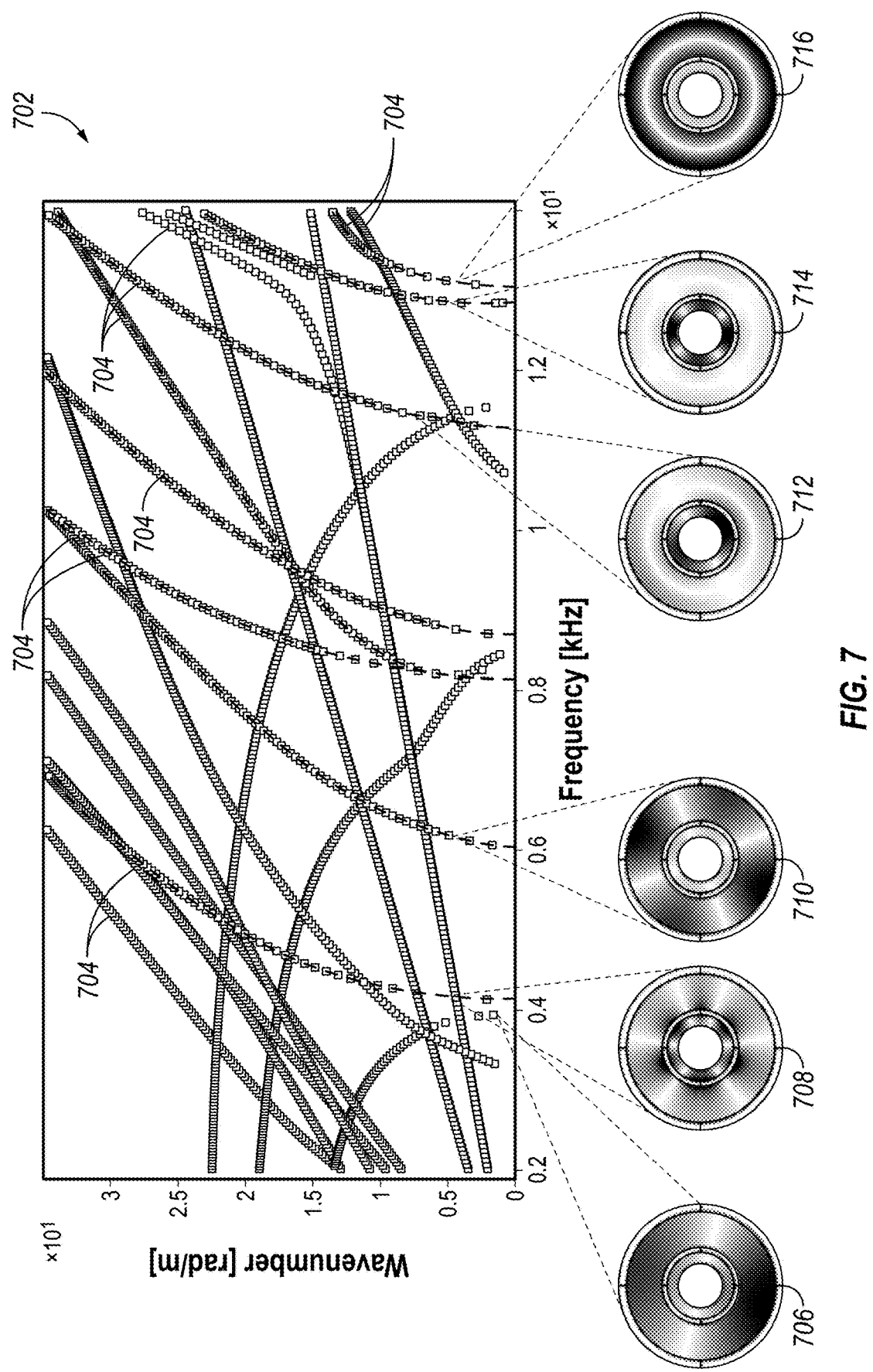
FIG. 7 illustrates a dispersion curve.

FIG. 7 illustrates a dispersion curve (wavenumber vs. frequency) generated from mode analysis simulation from at least part of a conduit string 108 and conduit string 138 (e.g., referring to FIG. 1) dispersion configuration 700. Resonance mode signals 704 for dispersion configuration 700 may be identified by a curve approaching the x-axis (zero wavenumber) vertically due to the group velocity of a standing wave being zero. Each resonance mode signal 704 represents a specific modal frequency and a mode shape. The corresponding mode shape from each resonance mode signal 704 may also be identified from mode analysis or numerical simulation. Modeshape generated from mode analysis may be used to identify the nature of the mode and whether it is sensitive to cement bonding. The mode shape of a specific mode may be expressed as pressure level in the fluid 502 (e.g., referring to FIG. 5) or the displacement/stress in the conduit string 108 and/or conduit string 138. For example, monopole resonant signal 706 and quadrupole resonance signal 710 resonance mode may be a first order radial direction acoustic resonance mode shapes. Dipole resonance signal 712, quadrupole resonance signal 714, and monopole resonance signal 716 may depict a second order radial direction acoustic resonance mode shapes. Resonance signal 708 is a hexapole mode due to tubing vibration. A resonance mode may be excited by a transmitter 102 (e.g., referring to FIG. 1) of the same mode at the corresponding resonance frequency. A resonance mode may be generated from mode conversion due to eccentricity, bonding condition, or other asymmetry.

A resonance mode may also be categorized by a dominant domain of vibration, such as inner annulus, outer annulus or both inner and outer annulus. For example, monopole mode resonance mode shape 706, quadrupole resonance mode shape 710, second order dipole resonance mode shape 712, and second order monopole resonance mode shape 716 may comprise energy in conduit string 138 and conduit string 108. The pressure in conduit string 108 may induce a displacement in the casing, forming leaky waves within the cement behind and/or within one or more tubulars of conduit string 108. Hence monopole resonance signal 706, quadrupole acoustic resonance signal 710, second order dipole resonance signal 712, and second order monopole resonance signal 716 may be particularly sensitive to cement bonding. The frequency of these modes are also more sensitive to the cement bonding behind the casing. In another word, the frequency increases as there are more cement loss behind casing. We can also call this a blue-shift of resonance frequency to detect cement loss behind the casing. Resonance modes may be more sensitive in one or more cement bonding conditions. This phenomenon may be further explored in FIG. 8.

Figure 8:
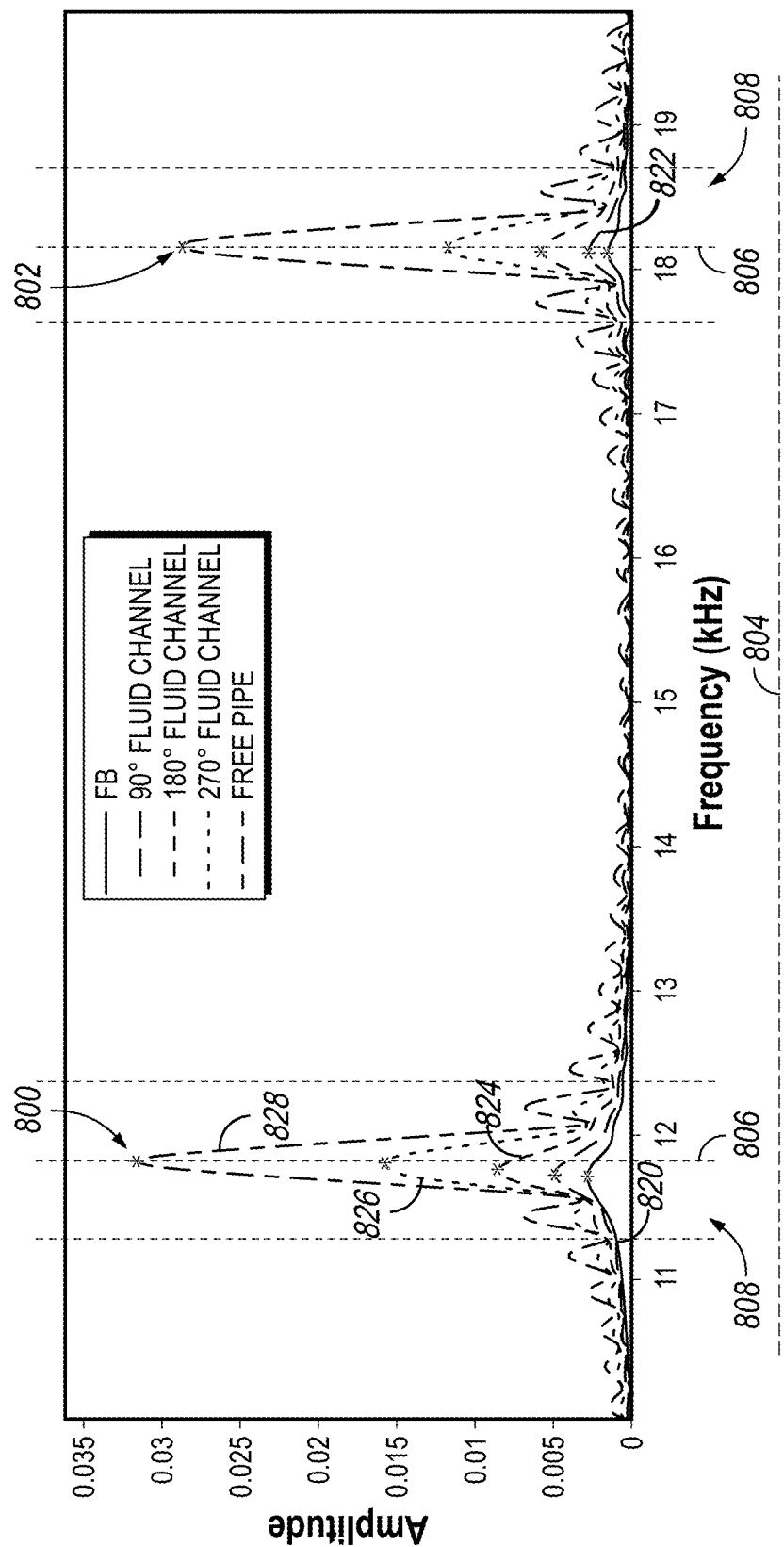
FIG. 8 illustrates simulation data of various cement bonding conditions.

FIG. 8 is a graph that maps simulation data of various cement bonding conditions. First resonance mode 800, second resonance mode 802, and non-resonance fully bonded 820, 90-degree fluid channel 822, 180-degree fluid channel 824, 270-degree fluid channel 826, and free pipe 828 signals of one or more bonding conditions have different frequency spectrums. Early time arrivals 602 (e.g., referring to FIG. 6) are non-resonance signals and may have a broad frequency spectrum 804 associated with the transmit voltage response of the transmitter. The resonance signals may propagate as a narrow band 806 with an associated isolated modal frequency 808. For some resonance modes, modal frequency 806 may be sensitive to cement bonding conditions. As such, the frequency spectrum may be computed by taking the late time arrivals 604 (e.g., referring to FIG. 6) and performing a Fourier transform.

In examples first resonance mode 800 and second resonance mode 802 may be standing waves within the casing. Cement loss behind casing is equivalent to the effect of reduced mass with less impact on the stiffness. Hence the first resonance mode 800 and second mode 802 shifts higher with unbonded cement. As such, a modal frequency log may be constructed to represent a cement bond log, to be discussed below. The modal frequency log may be normalized to have the highest frequency to represent free pipe condition and lowest frequency to represent fully bonded condition.

Figure 9:
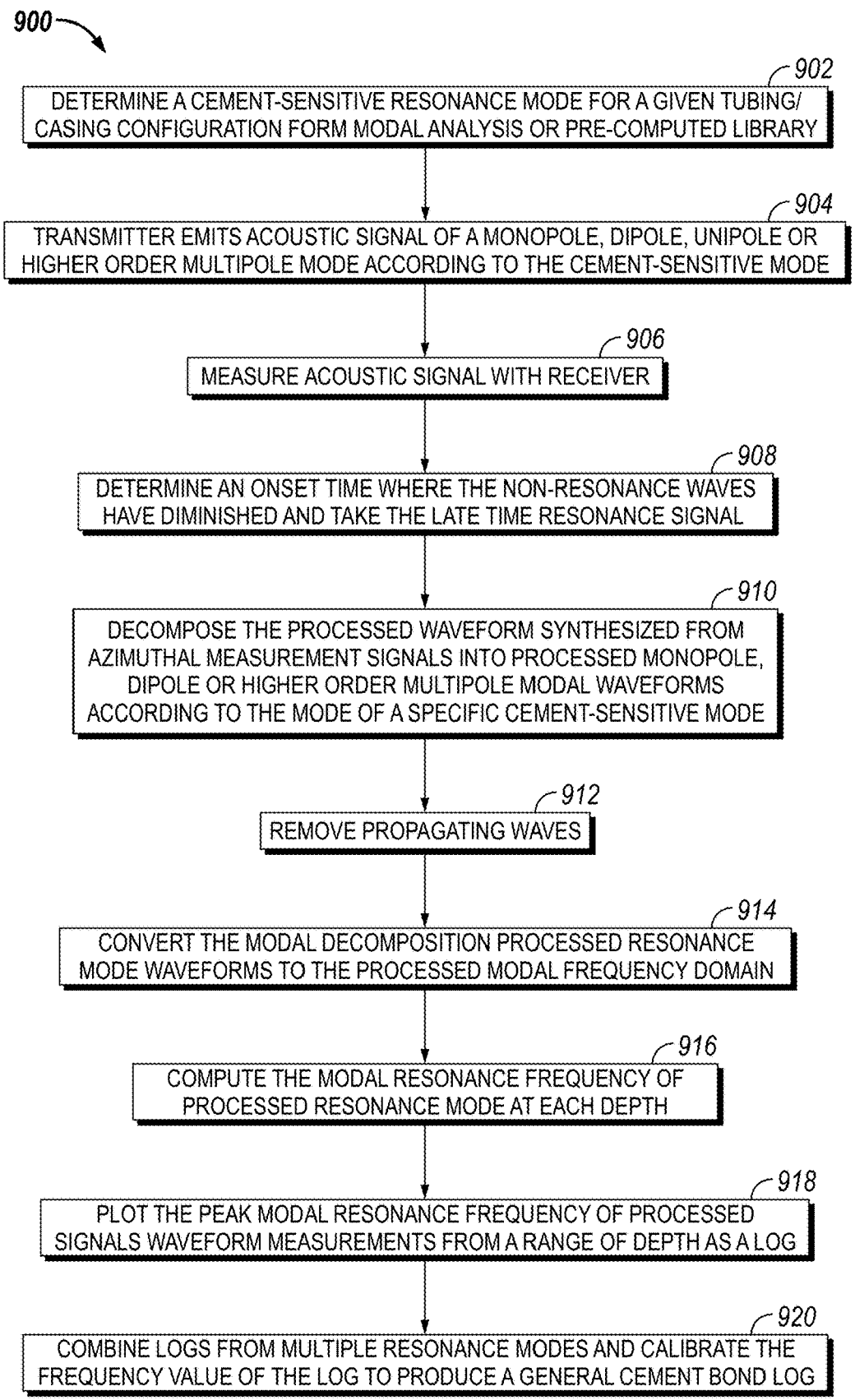
FIG. 9 illustrates a modal frequency method.

FIG. 9 illustrates a workflow 900 for identifying a modal frequency. In examples, workflow 900 may be performed and/or operated on information handling system 144 (e.g., referring to FIG. 1). In block 902, a cement-sensitive resonance mode for a given tubing/casing configuration from modal analysis or a pre-computed library may be determined. In examples, modal analysis or a pre-computed library may determine a resonance mode selected from monopole acoustic resonance mode shape 706 (e.g., referring to FIG. 7), dipole resonant signal 708, quadrupole acoustic resonance mode shape 710, second order dipole acoustic resonance mode shape 712, second order quadrupole resonance signal 714, and second order monopole acoustic resonance mode shape 716. In block 904, at a first depth at any point within wellbore 110, transmitter 102 (e.g., referring to FIG. 5) may emit shaped acoustic signal 500. Shaped acoustic signal 500 may be monopole, dipole, unipole or higher order multipole mode according to the frequency and multipole of the cement-sensitive mode. The transmitted acoustic signal may propagate within formation 124 and return to receiver 104. In block 906, return signal 508 may be measured with receiver 104. Any number of receivers 104 may comprise azimuthal receivers, monopole receivers, monopole receiver, dipole receiver or receiver for higher order multipoles. In block 908, where the non-resonance waves may be diminished, time response signal may be determined. As such, a cut-off time may be determined to remove the early time non-resonance arrivals. Herein, cut-off time may be defined as the starting time when selecting the segment of time domain signal and may be determined by the length of source waveform, tubing and casing diameters, degree of eccentricity and transmitter-receiver (TR) offset. A time segment may be taken from the cut-off time to a time when the signal is sufficiently diminished. Herein sufficiently diminished may be from when the signal is diminished from 99.99% to 99%, 99% to 50%, 50% to 1%, or 1% to 0.01%.

In block 910, the processed waveform synthesized form azimuthal measurement signals into processed, monopole, dipole, or higher order multipole modal waveforms according to the mode of a specific cement-sensitive mode may be decomposed. As such, received signal 508 (e.g., referring to FIG. 5) may be decomposed according to the mode of a specific cement-sensitive mode, forming a decomposed waveform. For azimuthal array receiver, the signals are decomposed to monopole, dipole, quadrupole and higher order multipole responses. For a monopole, dipole or higher order multipole receiver, receiver 104 (e.g., referring to FIG. 1) may receive signal of a specific multimode and do not require decomposition. In block 912, propagating waves may be removed from the decomposed waveform utilizing signal processing techniques to form a processed waveform. Signal processing techniques may comprise frequency-wavenumber filtering, slant-stack transform, the Radon transform, and/or the like. Propagating waves may comprise reflection waves, guided waves, tool mode, and/or Stoneley waves.

In block 914, processed waveform from block 912 may be converted from a modal decomposition processed resonance mode waveform to a processed modal frequency domain. As such, processed waveform from block 912 may be transformed from time domain into frequency domain with a Fourier transform to form a modal frequency signal. In block 916, the modal resonance frequency of the processed resonance mode at each depth may be computed. As such, a modal resonance frequency of a modal frequency signal may be computed. Each modal frequency signal may comprise a cement-sensitive resonance mode. Thus, first resonance mode 800 (e.g., referring to FIG. 8) and second mode 802 may be present in every modal frequency signal. Thus, the modal resonance frequency of a modal frequency signal may be computed as the peak frequency or the centroid of the frequency spectrum for each modal frequency log at the depth of acoustic logging tool 100 (e.g., referring to FIG. 1). Referring back to FIG. 8, the peaks for 800 and 802 may be determined by the corresponding frequency of the peak (maximum amplitude in a frequency spectrum). Alternatively, the centroid of the frequency spectrum may be utilized as the frequency peak. In examples, the centroid of the frequency spectrum may be half of the total frequency spectrum with no more than 10% difference. If the frequency spectrum of a certain mode is left-skewed or right-skewed, the centroid is slightly to the left or the right from the peak frequency.

In block 918, the peak frequency from block 916 or modal resonance frequency from block 916 of processed signals waveform measurements from a range of at a first depth at any point within wellbore 110 may be plotted as a wellbore log. As such, acoustic logging tool 100 may be conveyed to a plurality of depths within wellbore 110 and repeat blocks 902-916 to populate a modal frequency log. Additionally, a plurality of resonance modes may be employed to produce a plurality of modal frequency logs. In block 920, logs found from block 918 that may comprise multiple resonance modes may be combined and the frequency value of the log to produce a general cement bond may be calibrated. As such, the plurality of modal frequency logs may be combined from multiple resonance modes and calibrate the amplitude of the log to produce an aggregate cement bond log. For example, modal frequency logs from several cement-sensitive modes may be combined to produce the aggregate cement bond log. The overall cement bond log may be a weighted average of logs from several cement-sensitive modes, where the weights depend on the sensitivity of individual modes. Finally, the amplitude of the log may be combined with the amplitude of free pipe or fully bonded section which is from field test, laboratory test or simulation. The final generalized log is normalized to have a unified free pipe value (e.g., one), and a unified fully bonded value (e.g., zero). Additionally, modal frequency method 900 may be repeated for different frequencies. The returns may be illustrated in FIG. 10.

Figure 10:
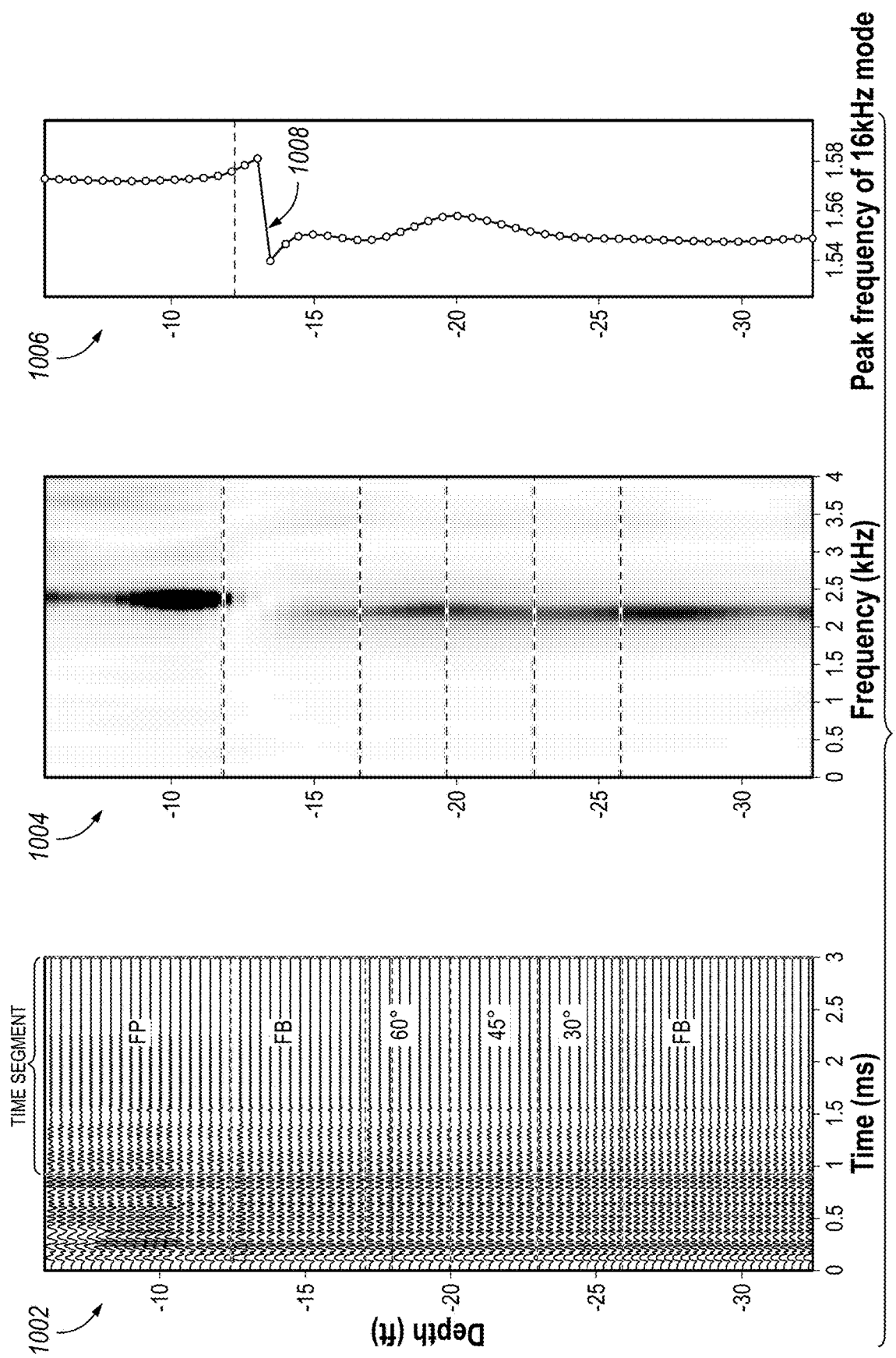
FIG. 10 illustrates an example of modal frequency method.

FIG. 10 illustrates graphs found utilizing workflow 900 (e.g., referring to FIG. 9). The data is taken from a test well with different bonding conditions, which are free pipe, fully bonded, and partially bonded section with fluid 502 (e.g., referring to FIG. 5) channel width. The cement sensitive mode is a dipole mode, and the signal is excited with a dipole source and received by segmented receivers. Decompressed waveform 1002 from block 910 provides a monopole response of azimuthal receiver signals. Similarly, resonance signal 1004 from block 912 shows the product of block 912 after a Fourier transform is performed on the decompressed waveform 1002. As previously discussed, the modal frequency log 1006 may be computed as discussed in block 916. Modal frequency log 1006 shows the difference between fully bonded and free pipe section and partially bonded section. As such, frequency log 1006 produces a correlation to how proficient a cement bond is at a given depth. If the cement bond is not proficient at a given depth, then a remediation plan may be implemented. Herein, a proficient cement bond may be 100%-75% full bonded, 75%-25% fully bonded, or 25%-1% fully bonded. The difference between free pipe and fully bonded may be illustrated in frequency shift 1008. The frequency shift is calculated from the peak frequency in 1004 and is caused by cement bonding change. FIGS. 9 and 10 illustrate workflow 900 and provide a graphical representation of its effectiveness. In other examples, a modal frequency may be combined with a chirp signal.

Figure 11:
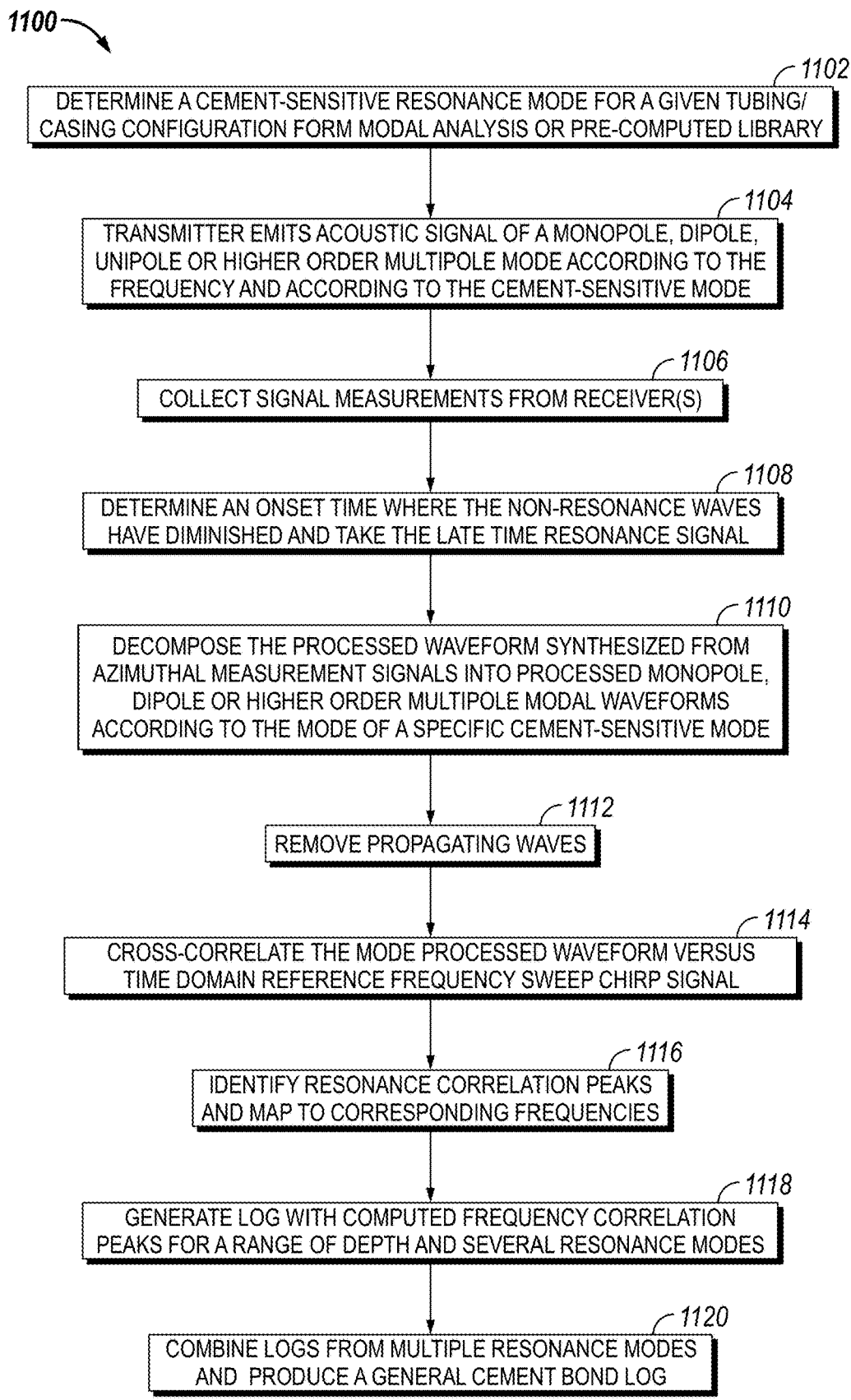
FIG. 11 illustrates modal frequency with chirp signal method.

FIG. 11 illustrates a workflow 1100 for identifying a modal frequency with a chirp signal. In examples, workflow 1100 may be performed and/or operated on information handling system 144 (e.g., referring to FIG. 1). In block 1102, a cement-sensitive resonance mode for a given tubing/casing configuration from modal analysis or a pre-computed library may be determined. In examples, modal analysis or a pre-computed library may determine a resonance mode selected from monopole acoustic resonance mode shape 706 (e.g., referring to FIG. 7), dipole resonant signal 708, quadrupole acoustic resonance mode shape 710, second order dipole acoustic resonance mode shape 712, second order quadrupole resonance signal 714, and second order monopole acoustic resonance mode shape 716. In block 1104, at a first depth at any point within wellbore 110, transmitter 102 (e.g., referring to FIG. 5) may emit shaped acoustic signal 500. Shaped acoustic signal 500 may be monopole, dipole, unipole or higher order multipole mode according to the frequency and multipole of the cement-sensitive mode. The transmitted acoustic signal may propagate within formation 124 and return to receiver 104. In block 1106, return signal 508 may be measured with receiver 104. Any number of receivers 104 may comprise azimuthal receivers, monopole receivers, monopole receiver, dipole receiver or receiver for higher order multipoles. In block 1108, where the non-resonance waves may be diminished, time response signal may be determined. As such, a cut-off time may be determined to remove the early time non-resonance arrivals. Herein, cut-off time may be defined as the starting time when selecting the segment of time domain signal and may be determined by the length of source waveform, tubing and casing diameters, degree of eccentricity and transmitter-receiver (TR) offset. A time segment may be taken from the cut-off time to a time when the signal is sufficiently diminished. Herein sufficiently diminished may be from when the signal is diminished from 99.99% to 99%, 99% to 50%, 50% to 1%, or 1% to 0.01%.

In block 1110, the processed waveform synthesized form azimuthal measurement signals into processed, monopole, dipole, or higher order multipole modal waveforms according to the mode of a specific cement-sensitive mode may be decomposed. As such, received signal 508 (e.g., referring to FIG. 5) may be decomposed according to the mode of a specific cement-sensitive mode, forming a decomposed waveform. For azimuthal array receiver, the signals are decomposed to monopole, dipole, quadrupole and higher order multipole responses. For a monopole, dipole or higher order multipole receiver, receiver 104 (e.g., referring to FIG. 1) may receive signal of a specific multimode and do not require decomposition. In block 1112, propagating waves may be removed from the decomposed waveform utilizing signal processing techniques to form a processed waveform. Signal processing techniques may comprise frequency-wavenumber filtering, slant-stack transform, the Radon transform, and/or the like. Propagating waves may comprise reflection waves, guided waves, tool mode, and/or Stoneley waves.

In block 1114, the processed waveform from block 1112 may be cross correlated with a chirp signal to produce a cross correlated signal. A chirp signal is a signal in which the frequency increases with time. Block 114 may comprise mapping an index in a time series to a frequency of the chirp signal at every index in the time series. A frequency shift may be identified in the cross-correlated signal as shift of the peak along time axis. There is no minimum frequency shift. In examples, a shift may be indicative of difference in depth of twenty feet of wellbore 110 (e.g., referring to FIG. 1). Herein, a cross correlation may be defined as a measure of similarity of two series as a function of displacement of one relative to the other. Thus, when two signals have the same frequency there may be a peak in the resultant waveform. In block 1116 resonance correlation peaks from the correlated signal produced in block 1114 may be identified as a modal frequency at the depth of acoustic logging tool 100 within wellbore 110. The resonance correlation peaks may be identified by mapping the index of the peak in the correlated signal to the chirp signal to find the corresponding frequency. In block 118, acoustic logging tool 100 may be conveyed to a plurality of depths and repeat blocks 1102-1116 to populate a modal frequency log. Additionally, a plurality of resonance modes may be employed to produce a plurality of modal frequency logs. Further in block 11120, the plurality of modal frequency logs may be combined from multiple resonance modes and calibrate the amplitude of the log to produce an aggregate cement bond log. For example, modal frequency logs from several cement-sensitive modes may be combined to produce the aggregate cement bond log. The overall cement bond log may be a weighted average of logs from several cement-sensitive modes, where the weights depend on the sensitivity of individual modes. Finally, the amplitude of the log needs to be normalized with the amplitude of free pipe or fully bonded section which is from field test, laboratory test or simulation. The final generalized log is normalized to have a unified free pipe value (e.g., one), and a unified fully bonded value (e.g., zero). Additionally, workflow 1100 may be repeated for different frequencies. The amplitude of the log may be graphed, as illustrated in FIG. 12.

Figure 12:
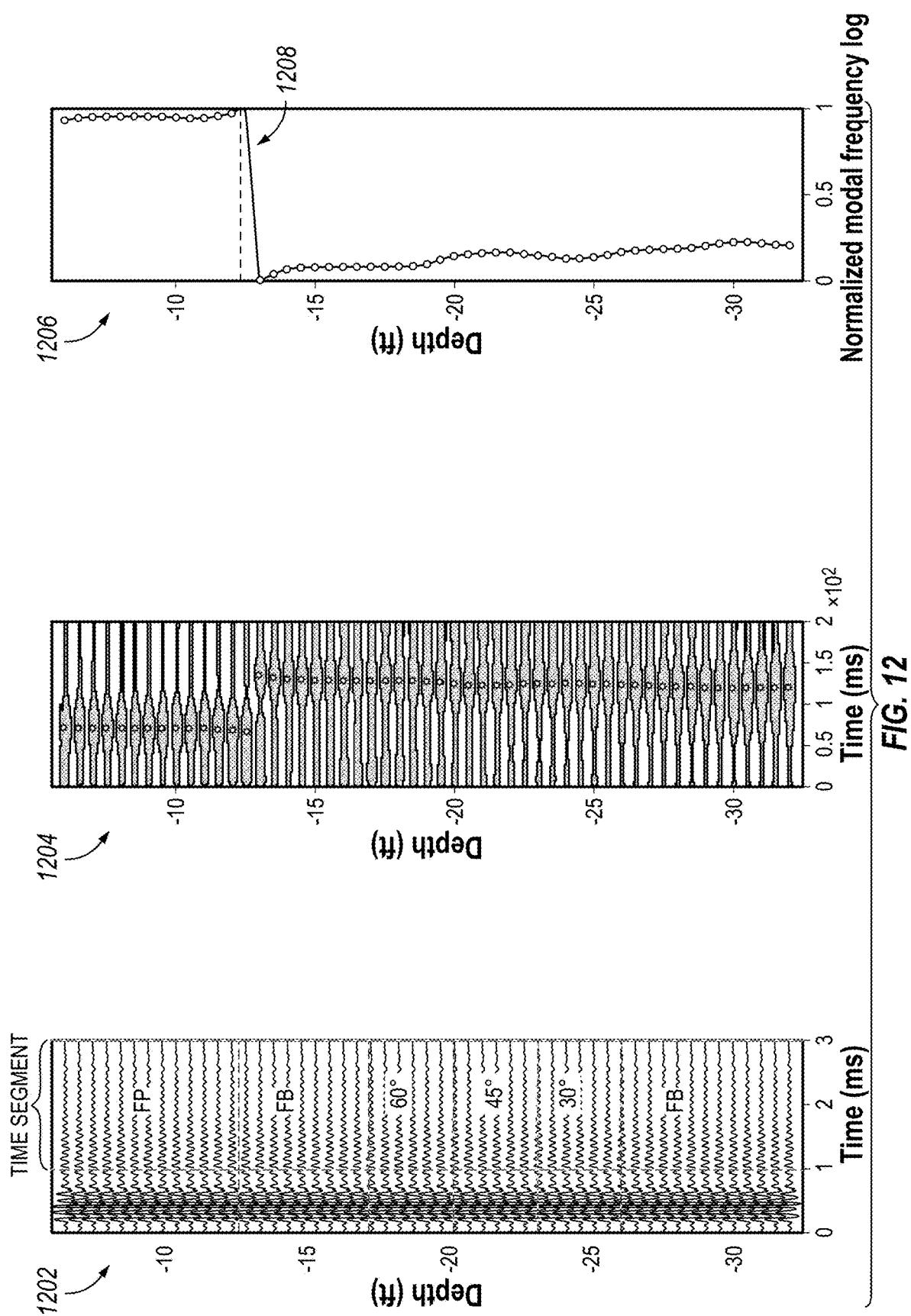
FIG. 12 illustrates a first example of modal frequency with chirp signal method.

FIG. 12 illustrates graphs formed from workflow 1100 (e.g., referring to FIG. 11). The data is taken from a test well with different bonding conditions, which are free pipe, fully bonded, and partially bonded section with fluid 502 (e.g., referring to FIG. 5) channel width. The cement sensitive mode is a dipole mode, and the signal is excited with a dipole source and received by segmented receivers. Decompressed waveform 1202 from block 1110 provides a monopole response of azimuthal receiver signals. Similarly, cross correlated signal from block 1114. As previously discussed, the modal frequency log 1206 may be computed by relating the location of the peak in waveform 1202 to a frequency. This is done by finding the corresponding frequency of the peak index in a chirp signal, as shown below. Modal frequency log 1206 shows the difference between fully bonded and free pipe section and partially bonded section. As such, frequency log 1206 produces a correlation to how proficient a cement bond is at a given depth. If the cement bond is not proficient at a given depth, then a remediation plan may be implemented. Herein, a proficient cement bond may be 100%-75% full bonded, 75%-25% fully bonded, or 25%-1% fully bonded. The difference between free pipe and fully bonded may be illustrated in frequency shift 1208. Modal frequency with chirp signal method 1100 may incorporate correlations between one or more signals.

Figure 13A:
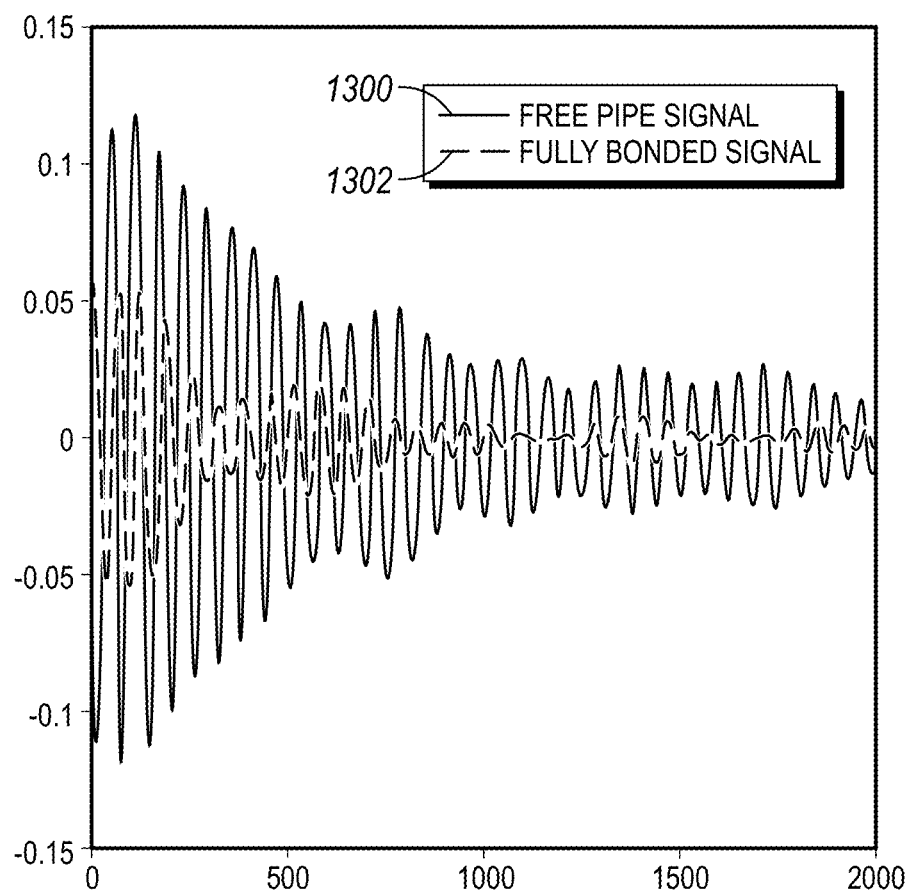
FIG. 13A illustrates computed monopole free pipe response signal.
Figure 13B:
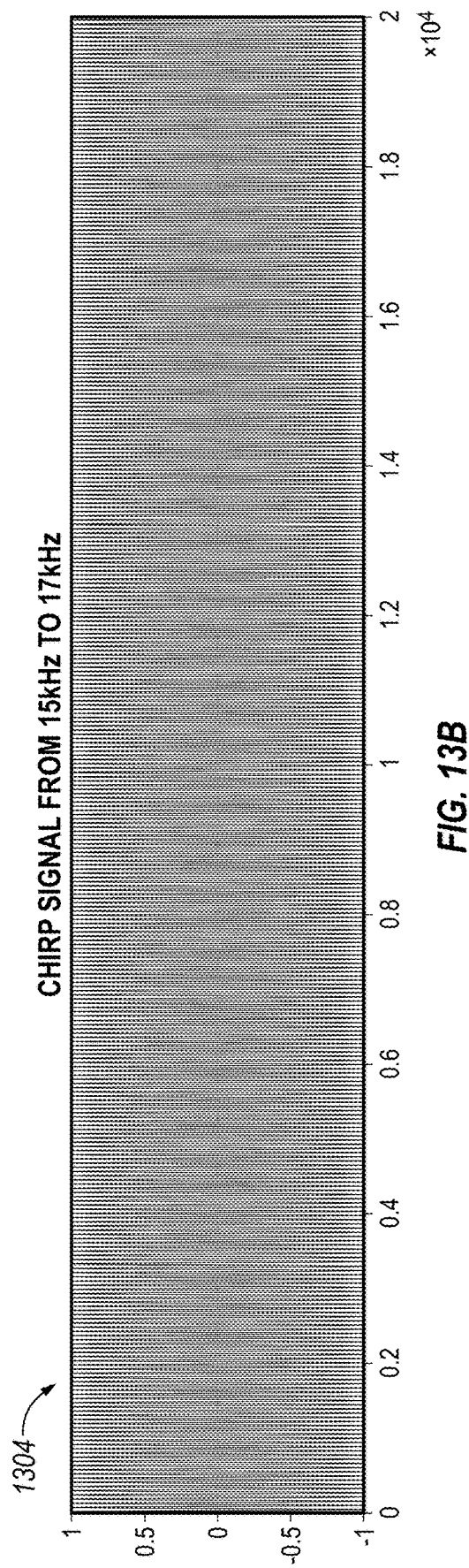
FIG. 13B illustrates chirp signal with frequency varying from 15 kHz to 17 kHz.
Figure 13C:
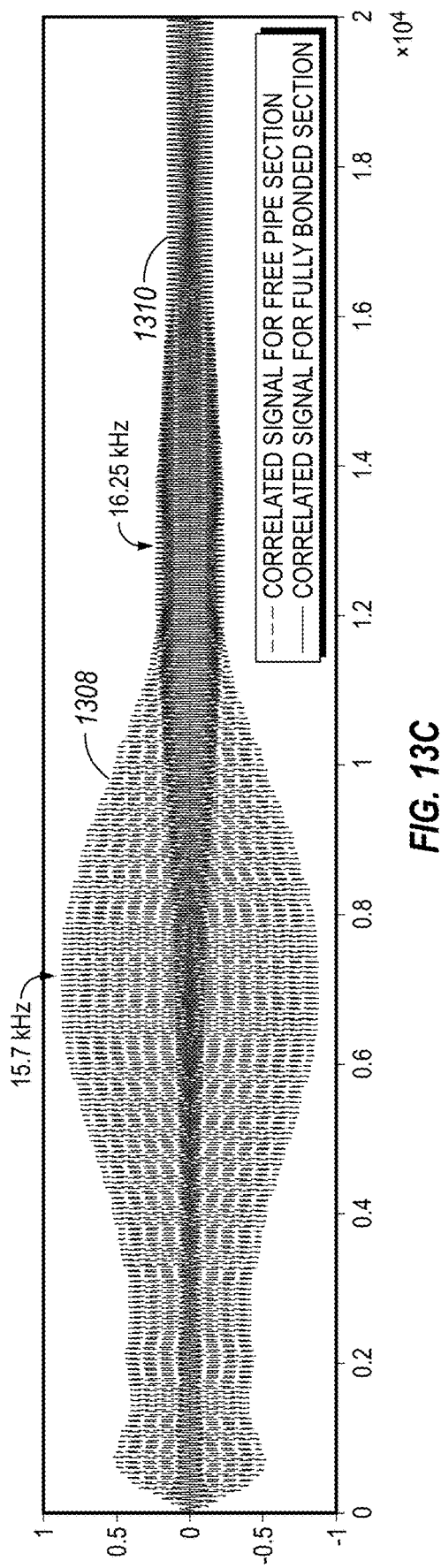
FIG. 13C illustrates first cross-correlated signal 1306 and second cross-correlated signal.

Workflow 1100 (e.g., referring to FIG. 11) may determine modal frequency from correlating the measured signal with a chirp signal and converting the peak in correlated signal into a frequency. Data graphed from the utilization of workflow 1100 is illustrated in FIGS. 13A13C. FIG. 13A is a graph that illustrates computed monopole free pipe response signal 1300. Additionally, FIG. 13A is a graph that illustrates computed monopole fully bonded response signal 1302 by taking late time arrivals (1-3 ms). FIG. 13B is a graph that illustrates chirp signal 1304 with frequency varying from 15 kHz to 17 kHz. FIG. 13C is a graph that illustrates first cross-correlated signal 1306 and second cross-correlated signal 1308. First cross-correlated signal 1306 may be between computed monopole free pipe response signal 1300 and chirp signal 1302. Additionally, second cross-correlated signal 1308 may be between computed monopole fully bonded response signal 1302 and chirp signal 1304.

Remediation procedures may be implemented to correct for non-proficient cement bonds that may be identified utilizing the methods and systems described above. In examples, remediations procedures may include oil excavation, soil vapor extraction, soil vapor extraction with air sparge, in-situ chemical oxidation, groundwater extraction and treatment through mechanical, chemical or biological means, and dual phase extraction. Additionally, one or more remediation operations may be identified and performed on the wellbore. General remediation may be performed by a downhole squeeze job. In some examples, for wellbore remediation, coiled tubing may deliver the remediation chemicals to the location of non-ideal cement bond. Further, remediation operations such as squeeze jobs, chemical remediations, oil excavation, soil vapor extraction, soil vapor extraction with air sparge, in-situ chemical oxidation, groundwater extraction and treatment through mechanical, chemical or biological means, and dual phase extraction, and/or the like may be performed to improve or at least partially repair one or more non-ideal cement bonds.

The methods and systems described above are an improvement over current technology in the method and systems herein remove non-resonance signals and enhance resonance signals. Specifically, methods and systems described herein determine amplitude of resonance signals from band-pass filtered time domain signal, with or without baseline removal. In effect, amplitude of resonance signals may be used to determine the quality of cement bonds. In contrast, current methods and techniques do not identify resonance modes.

The systems and methods for using a distributed acoustic system in a subsea environment may include any of the various features of the systems and methods disclosed herein, including one or more of the following statements. Additionally, the systems and methods for an acoustic tool in a downhole environment may include any of the various features of the systems and methods disclosed herein, including one or more of the following statements.

Statement 1. A method comprising: selecting a cement sensitive mode based at least on a configuration of a conduit string, transmitting an acoustic signal into at least part of the conduit string, measuring a return signal from at least part of the conduit string, computing one or more modal resonance frequencies of a resonance mode from the return signal, and forming a modal frequency log of a resonance signal with at least the one or more modal resonance frequencies.

Statement 2. The method of statement 1, further comprising decomposing the return signal to form a decomposed waveform.

Statement 3. The method of statement 2, further comprising removing propagation waves from the decomposed waveform to form a processed waveform.

Statement 4. The method of statement 3, further comprising performing a Fourier transform on the processed waveform to transform to form a modal frequency signal.

Statement 5. The method of statement 4, wherein computing one or more modal resonance frequencies further comprises a peak frequency or a centroid of a frequency spectrum of the modal frequency signal.

Statement 6. The method of statement 5, wherein peak frequency is maximum amplitude in the frequency spectrum.

Statement 7. The method of statements 5 or 6, wherein the centroid of the frequency spectrum is half of the total frequency spectrum with no more than 10% difference.

Statement 8. The method of statements 1, 2, or 3, further comprising forming a cross correlated signal between the processed waveform and a chirp signal.

Statement 9. The method of statement 8, wherein the cross correlation is a measurement of similarity of two signals as a function of displacement of one relative to the other.

Statement 10. The method of statements 8 or 9, further comprising determining a frequency shift, wherein a frequency shift is a change of resonance modal frequency.

Statement 11. The method of statements 8, 9, or 10, wherein a resonance correlation peak may be identified by mapping an index of the peak in the cross correlated signal to the corresponding frequency.

Statement 12. A system comprising: a transmitter configured to transmit an acoustic signal into at least part of a conduit string, a receiver configured to measuring a return signal from at least part of the conduit string, an information handling system configured for: selecting a cement sensitive mode based at least on a configuration of a conduit string, computing one or more modal resonance frequencies of a resonance mode from the return signal, and forming a modal frequency log of a resonance signal with at least the one or more modal resonance frequencies.

Statement 13. The system of statement 12, wherein the information handling system is further configured to decompose the return signal to form a decomposed waveform.

Statement 14. The system of statement 13, wherein the information handling system is further configured to remove propagation waves from the decomposed waveform to form a processed waveform.

Statement 15. The system of statement 14, wherein the information handling system is further configured to perform a Fourier transform on the processed waveform to transform to form a modal frequency signal, wherein computing one or more modal resonance frequencies further comprises a peak frequency or a centroid of a frequency spectrum of the modal frequency signal.

Statement 16. The system of statement 14 or 15, wherein the information handling system is further configured to form a cross correlated signal between the processed waveform and a chirp signal, wherein the cross correlation is a measurement of similarity of two signals as a function of displacement of one relative to the other.

Statement 17. A non-transitory storage computer-readable medium storing one or more instructions that, when executed by a processor, cause the processor to: select a cement sensitive mode based at least on a configuration of a conduit string, obtain a return signal from a receiver configured to measure the return signal from at least part of the conduit string, compute one or more modal resonance frequencies of a resonance mode from the return signal, and form a modal frequency log of the resonance signal with at least the one or more modal resonance frequencies.

Statement 18. The non-transitory storage computer readable medium of statement 17, wherein the one or more instructions, that when executed by the processor, further cause the processor to decompose the return signal to form a decomposed waveform and remove propagation waves from the decomposed waveform to form a processed waveform.

Statement 19. The non-transitory storage computer readable medium of statement 18, wherein the one or more instructions, that when executed by the processor, further cause the processor to perform a Fourier transform on the processed waveform to transform to form a modal frequency signal, wherein computing one or more modal resonance frequencies further comprises a peak frequency or a centroid of a frequency spectrum of the modal frequency signal.

Statement 20. The non-transitory storage computer readable medium of statement 19, wherein the one or more instructions, that when executed by the processor, further cause the processor to form a cross correlated signal between the processed waveform and a chirp signal, wherein the cross correlation is a measurement of similarity of two signals as a function of displacement of one relative to the other.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods may also "consist essentially of" or "consist of" the various components and steps. Moreover, the indefinite articles "a" or "an," as used in the claims, are defined herein to mean one or more than one of the elements that it introduces.

For the sake of brevity, only certain ranges are explicitly disclosed herein. However, ranges from any lower limit may be combined with any upper limit to recite a range not explicitly recited, as well as ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method comprising:
   selecting a cement sensitive mode based at least on a configuration of a borehole;
   transmitting an acoustic signal into at least part of the conduit string, wherein the acoustic signal is based at least in part on the cement sensitive mode;
   measuring a return signal from at least part of the conduit string;
   computing one or more modal resonance frequencies of a resonance mode from the return signal; and
   forming a modal frequency log of a resonance signal with at least the one or more modal resonance frequencies.

2. The method of claim 1, further comprising decomposing the return signal to form a decomposed waveform.

3. The method of claim 2, further comprising removing propagation waves from the decomposed waveform to form a processed waveform.

4. The method of claim 3, further comprising performing a Fourier transform on the processed waveform to form a modal frequency signal.

5. The method of claim 4, wherein computing one or more modal resonance frequencies further comprises determining a peak frequency or a centroid of a frequency spectrum of the modal frequency signal.

6. The method of claim 5, wherein the centroid of the frequency has no more than 10% difference.

7. The method of claim 3, further comprising forming a cross correlated signal between the processed waveform and a chirp signal.

8. The method of claim 7, wherein the cross correlation is a measurement of similarity of two signals as a function of displacement of one relative to the other.

9. The method of claim 7, further comprising determining a frequency shift, wherein a frequency shift is a change of resonance modal frequency.

10. The method of claim 7, wherein a resonance correlation peak may be identified by mapping an index of the peak in the cross correlated signal to the corresponding frequency.

11. A system comprising:
    an information handling system configured for:
        selecting a cement sensitive mode based at least on a configuration of a borehole;
        computing one or more modal resonance frequencies of a resonance mode from the return signal; and
        forming a modal frequency log of a resonance signal with at least the one or more modal resonance frequencies;
    a transmitter configured to transmit an acoustic signal into at least part of a conduit string, wherein the acoustic signal is based at least in part on the cement sensitive mode; and a receiver configured to measuring a return signal from at least part of the conduit string.

12. The system of claim 11, wherein the information handling system is further configured to decompose the return signal to form a decomposed waveform.

13. The system of claim 12, wherein the information handling system is further configured to remove propagation waves from the decomposed waveform to form a processed waveform.

14. The system of claim 13, wherein the information handling system is further configured to perform a Fourier transform on the processed waveform to form a modal frequency signal, wherein computing one or more modal resonance frequencies further comprises determining a peak frequency or a centroid of a frequency spectrum of the modal frequency signal.

15. The system of claim 13, wherein the information handling system is further configured to form a cross correlated signal between the processed waveform and a chirp signal, wherein the cross correlation is a measurement of similarity of two signals as a function of displacement of one relative to the other.

16. A non-transitory storage computer-readable medium storing one or more instructions that, when executed by a processor, cause the processor to:

select a cement sensitive mode based at least on a configuration of a borehole;

obtain a return signal from a receiver configured to measure the return signal from at least part of the conduit string;

compute one or more modal resonance frequencies of a resonance mode from the return signal; and form a modal frequency log of the resonance signal with at least the one or more modal resonance frequencies.

17. The non-transitory storage computer readable medium of claim 16, wherein the one or more instructions, that when executed by the processor, further cause the processor to decompose the return signal to form a decomposed waveform and remove propagation waves from the decomposed waveform to form a processed waveform.

18. The non-transitory storage computer readable medium of claim 17, wherein the one or more instructions, that when executed by the processor, further cause the processor to perform a Fourier transform on the processed waveform to form a modal frequency signal, wherein computing one or more modal resonance frequencies further comprises a peak frequency or a centroid of a frequency spectrum of the modal frequency signal.

19. The non-transitory storage computer readable medium of claim 18, wherein the one or more instructions, that when executed by the processor, further cause the processor to form a cross correlated signal between the processed waveform and a chirp signal, wherein the cross correlation is a measurement of similarity of two signals as a function of displacement of one relative to the other.

\* \* \* \* \*